United States Patent [19]

Seo et al.

[11] Patent Number: 4,985,179
[45] Date of Patent: Jan. 15, 1991

[54] OPTICAL MATERIAL

[75] Inventors: Iwao Seo; Kenji Nakajima; Manabu Kishimoto, all of Ibaraki, Japan

[73] Assignee: Mitsubishi Petrochemical Co., Ltd., Tokyo, Japan

[21] Appl. No.: 359,279

[22] Filed: May 31, 1989

[30] Foreign Application Priority Data

May 31, 1988 [JP] Japan ................... 63-133701

[51] Int. Cl.$^5$ ............................. G02B 1/04; G02B 1/02
[52] U.S. Cl. .................................... 252/587; 252/582; 252/583; 252/589; 350/353; 350/96.1; 350/96.12; 526/300
[58] Field of Search ............... 524/186, 260; 252/582, 252/583, 589, 587; 350/353, 96.1, 96.12

[56] References Cited

U.S. PATENT DOCUMENTS

| | | | |
|---|---|---|---|
| 4,113,482 | 9/1978 | Wells | 430/41 |
| 4,720,355 | 1/1988 | DeMartino | 350/353 |
| 4,820,026 | 3/1987 | Okada et al. | 350/341 |

FOREIGN PATENT DOCUMENTS 160427 7/1987 Japan .

OTHER PUBLICATIONS

Considine, Douglas Ed., *Chemical and Process Technology Encyclopedia*, McGraw-Hill, N.Y., 1974, p. 904.
Levine et al., "An Organic Crystal with an Exceptionally Large Optical Second Harmonic Coefficient", J. Appl. Phys., Apr. 1970.
Williams, "Organic Polymeric and Non-Polymeric Materials with Large Optical Nonlinearities", Angew. Chem. Int. Ed. Eng. 23 (1984) pp. 690–703.

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

An optical material obtained by electrically polarizing a high polymer molded article obtained from a composition comprising a copolymer of vinylidene cyanide and at least one comonomer selected from vinyl compounds, other vinylidene compounds and dienes having uniformly dispersed therein from 0.1 to 70% by weight of an organic molecular crystal having nonlinear optical effects, with the total amount of the copolymer and the organic molecular crystal being 100% by weight. The optical material has excellent orientation of the organic molecular crystal, great nonlinear optical effects, and excellent moldability.

5 Claims, No Drawings

OPTICAL MATERIAL

FIELD OF THE INVENTION

This invention relates to an optical material for use as an optical element in optical communication and optical information processing fields. More particularly, it relates to an optical material comprising a high polymer molded article exhibiting nonlinear optical effects, excellent mechanical strength and excellent moldability.

BACKGROUND OF THE INVENTION

Application of lasers to optical communication, optical information processing, optical processing, and the like requires optical elements having various functions, such as deflection, modulation or wavelength conversion. Optical materials having nonlinear optical effects play a central role as such optical elements.

Conventional studies on nonlinear optical materials have been centered at inorganic crystals, e.g., $LiNbO_3$, $LiIO_3$, $KH_2PO_4$, and GaAs. Since these inorganic crystals, however, respond to light by their electrons participating in chemical bonding among atoms or ions and are therefore attended by lattice vibration, it is impossible to obtain a higher response rate than picoseconds. Further, the thresholds of breakage by strong laser beams are on the order of $MW/cm^2$. In addition, since these inorganic materials are generally used as single crystals, they are insufficient in mechanical strength, particularly impact strength, and moldability for practical use.

On the other hand, organic molecular crystals, e.g., urea, p-nitroaniline (p-NA), and 2-methyl-4-nitroaniline (MNA), possess great nonlinear optical effects attributed to intramolecular non-localized $\pi$-electrons. Because electron polarization of these organic materials is free from influences of lattice vibration, higher response rates and higher optical breakage thresholds are noted as compared with the inorganic crystals. Notwithstanding, they should be single crystals before great nonlinear optical effects can be attained so that it is very difficult to handle the organic molecular crystals of high performance due to dynamic and thermal weakness and, also, they find difficulty in molding into fibers or films.

SUMMARY OF THE INVENTION

One object of this invention is to provide a novel optical material exhibiting great nonlinear optical effects which comprises a molded article of a high polymer excellent in moldability.

As a result of extensive investigations, the inventors have found that the above object of this invention can be accomplished by electrically polarizing a molded article obtained from a high polymer prepared by uniformly dispersing from 0.1 to 70% by weight of an organic molecular crystal having great nonlinear optical effects in a vinylidene cyanide copolymer comprising vinylidene cyanide represented by formula (I):

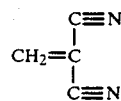
(I)

and at least one comonomer selected from vinyl compounds, other vinylidene compounds and dienes, with the total amount of the organic molecular crystal and the vinylidene cyanide copolymer being 100% by weight. If desired, the effect of polarization can be enhanced by stretching the molded article so as to have increased molecular orientation. The present invention has been completed based on this finding.

DETAILED DESCRIPTION OF THE INVENTION

The organic molecular crystals exhibiting nonlinear optical effects are known per se. They are constructed by molecules having a number of $\pi$-electrons. Such molecules are greatly polarized on modification with donors or acceptors to form an asymmetric potential within the molecule to thereby exhibit great nonlinear optical effects. Considering the nonlinear optical effects of the organic molecular crystals, what is of interest is to increase a susceptibility to secondary molecular nonlinearity $\beta$ of the individual molecules.

The organic molecular crystals which can be used in the present invention has a $\beta$ value of at least $1 \times 10^{-30}$ esu, preferably at least $10 \times 10^{-30}$ esu. Such organic molecular crystals include amino acids and derivatives thereof, urea and its derivatives, thiourea and its derivatives, saturated group-substituted benzene derivatives, unsaturated group-substituted benzene derivatives, pyridine derivatives, uracil derivatives, pyrimidine derivatives, oxygen-, sulfur- or nitrogencontaining heterocyclic derivatives, benzimidazole derivatives, and olefinimine-azo type compounds having a polar group. Specific examples of preferred organic molecular crystals are urea, bispentamethyleneurea, N,N'-dimethylurea, nitroaniline derivatives (e.g., p-nitroaniline, m-nitroaniline, 2-methyl-4-nitroaniline, 2-chloro-4-nitroaniline, 2-methyl-4-nitro-N-methylaniline, 2-methoxy-4-nitro-N-methylaniline, 2-acetamido-4,5-dinitroaniline, 3-acetamido-4-pyrrolidinonitrobenzene, and 3-acetamido-4-dimethylaminonitrobenzene), stilbene derivatives (e.g., 4-methoxy-4'-nitrostilbene and 4-dimethylamino-4-stilbene), nitropyridine derivatives (e.g., 3-methyl-4-nitropyridine N-oxide, 2-N-($\alpha$-methylbenzylamino)-5-nitropyridine, 2-N-cyclooctylamino5-nitropyridine, N-(5-nitro-2-pyridyl)-(S)-alaninol, and N-(5-nitro-2-pyridyl)-(S)-phenylalaninol), uracil derivatives (e.g., 5-nitrouracil and 6-azauracil), pyrimidine derivatives (e.g., 4-methoxy-6-phenylpyrimidine and 2-N-($\alpha$-methylbenzylamino)-5-nitropyrimidine), nitrophenyl-pyrrolinol derivatives (e.g., N-(4-nitrophenyl)-(S)-pyrrolinol and N-(3-hydroxy-4-nitrophenyl)-(S)-pyrrolinol), dinitrophenyl derivatives (e.g., 2,4-dinitrophenyl-(L)-serine and 2,4-dinitrophenyl-(L)-alanine methyl ester), nitrophenyl derivatives (e.g., N-(4-nitrophenyl)-N-methyl-2-aminopropionitrile, N-(4-nitrophenyl)-N-methyl-2-aminoacetonitrile, and N-(4-nitrophenyl)-4-aminobutanoic acid), benzyl, and benzophenone.

The vinylidene cyanide copolymer according to the present invention can be prepared by copolymerizing vinylidene cyanide with one or more comonomers selected from vinyl compounds, other vinylidene compounds and dienes. Examples of the comonomers include styrene, dichlorostyrene, chloromethylstyrene, acrylic acid and its esters, methacrylic acid and its esters, vinyl alcohol and its esters, vinyl chloride, vinylidene chloride, vinyl fluoride, vinylidene fluoride, ethylene trifluoride, vinyl formate, vinyl chloroacetate, isopropenyl acetate, vinyl propionate, vinyl butyrate, vinyl caproate, vinyl caprylate, vinyl stearate, vinyl dodecylate, vinyl pivalate, vinyl benzoate, butadiene, chlorobutadiene, isobutylene, maleic anhydride, acrylonitrile, fumaronitrile, α-chloroacrylonitrile, methylbutyronitrile, isopropenylacetic acid, vinyl ferrocene, methyl vinyl ketone, vinyl isobutyl ether, and cyanoacrylates. Copolymers using the ester compounds of the above-enumerated comonomers may be chemically modified partially or wholly by, for example, hydrolysis.

The molar ratio of vinylidene cyanide and the comonomers in the copolymer preferably falls within the range of from 0.5:1 to 1.5:1. A particularly preferred copolymer is an alternating copolymer having the above-described molar ratio of 1:1.

From 0.1 to 70% by weight, preferably from 5 to 40% by weight, more preferably from 10 to 35% by weight, of the organic molecular crystal is uniformly dispersed in from 30 to 99.9% by weight, preferably from 60 to 95% by weight, more preferably from 65 to 90% by weight, of the vinylidene cyanide copolymer by using a common solvent, for example, dimethylacetamide, dimethylformamide, dimethyl sulfoxide, or a mixed solvent of dimethyl sulfoxide and acetone, acetonitrile or β-propiolactone, with the total amount of the organic molecular crystal and the vinylidene cyanide copolymer being 100% by weight. The resulting composition is molded into a film, a sheet or a fiber having a thickness or diameter of from 0.1 to 1000 μm, preferably from 1 to 500 μm, by generally employed molding methods. The molding methods include solvent casting, wet spinning, press molding or extrusion molding, the latter two being carried out after removal of the solvent from the composition.

It is preferable that the molded article, irrespective of the molding method adopted, be stretched 2 to 6 times, preferably 2.5 to 5.5 times, in order to improve orientation. The stretching is desirably effected mechanically by uniaxially or biaxially.

The molded article, either stretched or unstretched, is subjected to electrical polarization so as to have increased nonlinear optical effects.

The polarization can be performed by heating the molded article to a prescribed temperature and applying a high direct electric field or a high direct electric field synergistically combined with an alternating electric field to the molded article from both sides thereof for a given period of time under heating, followed by gradually or rapidly cooling. The optimum temperature for the polarization is lower than the glass transition temperature of the molded article by from 0 to 100° C, and particularly by from 5 to 30° C.

The glass transition temperature of the molded article is a temperature corresponding to the peak of an endothermic curve of a sample weighing several milligrams as measured at a heating rate of 10° C./min by means of a differential scanning calorimeter.

In carrying out the polarization, a voltage generally ranging from 10 kV/cm up to an electric field strength which does not cause breakdown, preferably from 100 to 1500 kV/cm, is applied to both sides of the molded article generally via electrodes formed thereon, such as metallic foils, metallic plates, or metallic coatings formed by application of a conductive paste, chemical plating, vacuum evaporation or sputtering. The voltage application time is not particularly limited and usually ranges from 10 minutes to 5 hours, preferably from 10 minutes to 2 hours.

The vinylidene cyanide copolymer serving as a matrix is a polymer having a cyano group of large dipole moment. It has a very high dielectric relaxation strength ($\Delta\epsilon \simeq 100$) at temperatures higher than the glass transition temperature as reported in *Japan Journal Applied Physics*, Vol. 25, p.1178 (1986). It is therefore considered that an interaction cooperatively orientates the cyano group between dipoles and great piezoelectricity is exhibited on application of a high direct electric field in the vicinity of the glass transition temperature. In the molded article wherein organic molecular crystals having a large secondary nonlinear molecule susceptibility $\beta$ are dispersed in the vinylidene cyanide copolymer, the organic molecular crystals are efficiently orientated with the orientation of the cyano group in the matrix polymer, and the dynamic orientation and electrical polarization can be retained stably by the action of the internal electric field to thereby provide an optical material having great nonlinear optical effects.

Further, the optical material according to the present invention is dynamically and thermally resistant so that it can easily be molded into films or fibers. Furthermore, the optical material is satisfactory in transparency and has a refractive index close to that of optical fibers because of non-crystallinity of the matrix polymer.

The optical material of the present invention is therefore suitable for use in wavelength conversion elements, light shutters, polarizing elements, intensity-phase modulation elements, high-speed light switching elements, and so on and of great practical value in application to optical communication, optical information processing, and optical processing.

In application to, for example, wavelength conversion elements, a mixed solution of the vinylidene cyanide copolymer and the organic molecular crystal having nonlinear optical effects is spin-cast on NESA glass and vacuum-dried to form a thin film. Gold is vacuum deposited on the upper side of the film to form an electrode, and the film is subjected to polarization in a given electric field. When an incident light ray of a YAG laser, etc. is transmitted through the resulting film by means of a prism, lense or optical fiber in parallel to the film surface, the transmitted light has a reduced wavelength by half.

In application to light shutters, a transparent electrode is formed on each side of a film of the optical material of the invention. When light is transmitted through the film from the direction perpendicular to the film surface and a voltage is applied between the transparent electrodes, the quantity of transmitted light can be controlled.

The present invention is now illustrated in greater detail with reference to the following Examples, but it should be understood that the present invention is not deemed to be limited thereto.

In the examples, a piezoelectric constant $d_{31}$ indicative of transverse piezoelectric effect was obtained from the relationship between a quantity of charge generated on the surface of a sample and a stress on the section of the sample as determined by the use of "Vibron-II" (a trade name, manufactured by Toyo Baldwin Co.) at 110 Hz.

The nonlinear optical effects were evaluated by measuring an SHG (secondary harmonic generation) strength according to the method of S.K. Kurtz and T.T. Perry, *J. Appl. Phys.*, Vol. 39, p.3798 (1968). More specifically, a sample of a high polymer molded article was irradiated with a beam emitted from a Q-Switched Nd:YAG laser (repetition: 10 Hz; pulse width: 10 nsec;

pulse output: about 10 MW) having a wavelength of 1.064 μm. Green light generated was passed through a filter and a monochrometer to isolate a wavelength of 532 nm, and the monochromatic light was observed with a photomultiplier to determine a relative SHG strength, taking that of urea as a standard (1). In the determination, unlike a powder method of organic substances, since high polymeric samples easily transmits light, ten or more cast films were laminated so that the intensity of scattered light might not vary depending on the film thickness.

In the examples, all the percents are by weight unless otherwise indicated.

EXAMPLE 1

Each of a vinylidene cyanide-vinyl acetate alternating copolymer and 2-methyl-4-nitroaniline (MNA) was separately dissolved in N,N-dimethylacetamide (DMA) to prepare a 4% solution. The resulting two solutions were mixed to prepare a polymer solution containing 5%, 10%, 15%, 20%, 30%, 50%, or 60% of MNA based on the copolymer.

Each of the polymer solutions was cast on a glass plate and dried at 80° C. for 24 hours without ventilation. The cast film was subjected to ultrasonic cleaning in an aqueous methanol solution for 30 minutes and then vacuum-dried at 80° C. for 4 hours to remove DMA. The resulting 100 μm thick film was sandwiched in between a pair of tin foil electrodes and subjected to polarization at a temperature shown in Table 1 for 1 hour while applying a voltage of 450 kV/cm. The nonlinear optical characteristics and piezoelectric constant of the resulting optical material were determined, and the results obtained are shown in Table 1.

The film used in this example had a glass transition temperature of 165° C.

TABLE 1

| MNA (%) | Polarization Temp. (°C.) | $d_{31}$ (pC/N) | SHG Strength |
|---|---|---|---|
| 5 | 150 | 3.0 | 0.9 |
|  | 160 | 5.0 | 1.5 |
|  | 165 | 6.3 | 2.3 |
|  | 170 | 5.4 | 1.9 |
| 10 | 100 | 3.0 | 1.0 |
|  | 150 | 4.2 | 1.8 |
|  | 160 | 6.2 | 2.8 |
|  | 165 | 7.7 | 5.0 |
|  | 170 | 6.6 | 3.5 |
| 15 | 100 | 3.0 | 1.0 |
|  | 150 | 5.7 | 1.8 |
|  | 160 | 7.7 | 5.7 |
|  | 165 | 9.2 | 10.0 |
|  | 170 | 8.3 | 7.8 |
|  | 175 | 6.0 | 3.2 |
| 20 | 100 | 3.0 | 7.3 |
|  | 130 | 6.3 | 9.5 |
|  | 150 | 7.2 | 10.8 |
| 20 | 160 | 7.9 | 11.0 |
|  | 165 | 10.4 | 21.0 |
|  | 170 | 9.4 | 15.0 |
|  | 175 | 7.5 | 10.7 |
| 30 | 100 | 3.5 | 10.0 |
|  | 150 | 8.5 | 13.4 |
|  | 160 | 10.4 | 15.2 |
|  | 165 | 11.5 | 16.0 |
|  | 170 | 10.7 | 20.0 |
| 50 | 150 | 8.0 | 14.0 |
|  | 160 | 9.8 | 16.2 |
|  | 170 | 10.0 | 18.8 |
| 0 | 150 | 3.2 | 0.02 |
|  | 160 | 4.8 | 0.3 |
|  | 170 | 5.0 | 0.4 |

EXAMPLE 2

Each of the films obtained in Example 1 having varied MNA contents was uniaxially stretched three times in an oven at 15° C. to obtain a stretched film having a thickness of from 30 to 50 μm.

The film was subjected to electrical polarization via gold electrodes formed on both sides of the film by vacuum evaporation under conditions shown in Table 2. The resulting optical material was determined for nonlinear optical characteristics and piezoelectric constant. The results obtained are shown in Table 2. The film used here had a glass transition temperature of 165° C.

TABLE 2

| MNA (%) | Polarization Conditions Temp. (°C.) | Field Strength (kV/cm) | Time (hr) | Piezoelectric Constant $d_{31}$ (pC/N) | SHG Strength |
|---|---|---|---|---|---|
| 10 | 150 | 450 | 1 | 6.0 | 8.0 |
|  |  | 1000 | 1 | 12.4 | 16.0 |
|  | 160 | 450 | 1 | 6.6 | 8.5 |
|  |  |  | 2 | 8.4 | 12.5 |
|  |  |  | 3 | 9.2 | 14.3 |
|  | 170 | 450 | 1 | 9.3 | 15.5 |
|  |  | 800 | 1 | 14.4 | 18.5 |
|  |  | 1000 | 1 | 14.8 | 18.7 |
| 15 | 100 | 450 | 1 | 3.8 | 10.9 |
|  |  | 1000 | 1 | 7.5 | 13.8 |
|  | 160 | 450 | 1 | 8.3 | 17.0 |
|  |  | 1000 | 1 | 16.2 | 26.0 |
|  | 170 | 450 | 0.5 | 8.3 | 17.5 |
| 15 | 170 | 450 | 1 | 10.8 | 18.3 |
|  |  |  | 2 | 11.5 | 19.0 |
|  |  | 800 | 0.5 | 15.0 | 24.2 |
|  |  | 1000 | 0.5 | 16.1 | 25.3 |
| 20 | 100 | 450 | 1 | 5.1 | 2.5 |
|  |  | 1000 | 0.5 | 6.4 | 10.0 |
|  |  |  | 1 | 9.0 | 19.2 |
|  |  |  | 2 | 11.5 | 21.2 |
|  | 150 | 450 | 1 | 9.0 | 18.0 |
|  |  | 800 | 1 | 14.1 | 20.8 |
|  |  | 1000 | 1 | 15.3 | 23.0 |
|  |  | 1500 | 1 | 14.8 | 21.3 |
|  | 160 | 450 | 1 | 9.4 | 18.2 |
|  |  | 800 | 1 | 15.7 | 25.0 |
|  |  | 1000 | 1 | 16.4 | 28.0 |
|  | 170 | 200 | 1 | 3.5 | 6.0 |
|  |  | 450 | 1 | 11.9 | 20.1 |
|  |  | 800 | 1 | 17.1 | 31.2 |
|  |  | 1000 | 1 | 17.6 | 35.0 |
|  | 175 | 200 | 1 | 3.0 | 5.2 |
|  |  | 450 | 1 | 10.8 | 21.0 |
|  |  | 800 | 1 | 13.5 | 23.0 |
| 30 | 160 | 450 | 1 | 10.6 | 20.5 |
|  |  | 800 | 1 | 15.1 | 23.0 |
|  |  | 1000 | 0.5 | 17.6 | 28.1 |
|  |  |  | 1 | 16.4 | 26.0 |
| 50 | 160 | 450 | 1 | 10.0 | 20.2 |
|  |  | 800 | 1 | 13.2 | 18.3 |
|  |  | 1000 | 1 | 5.8 | 8.9 |
| 0 (Comparative) | 100 | 450 | 1 | 3.0 | 0.1 |
|  |  | 800 | 1 | 7.2 | 0.1 |
|  |  | 1000 | 1 | 8.6 | 0.3 |
|  | 160 | 450 | 1 | 5.2 | 0.3 |
|  |  | 800 | 1 | 9.8 | 0.5 |
|  |  |  | 2 | 12.0 | 0.9 |
|  |  | 1000 | 0.5 | 10.8 | 0.8 |
|  |  |  | 1 | 11.3 | 0.9 |
|  | 170 | 450 | 1 | 7.0 | 0.3 |
|  |  | 800 | 1 | 12.4 | 0.8 |
|  |  | 1000 | 1 | 14.0 | 1.0 |

EXAMPLE 3

Each of a vinylidene cyanide-vinyl benzoate alternating copolymer and 3-acetamino-4-dimethylaminonitrobenzene (DAN) was separately dissolved in dimethyl sulfoxide (DMSO) to prepare a 5% solution. The resulting solutions were mixed to prepare a polymer solution having a DAN content of 5%, 10%, or 20% based on the copolymer. A solvent-cast film was prepared from each polymer solution, and the film was uniaxially stretched about three times in an oven set at 160° C. The stretched film was subjected to polarization in the same manner as in Example 1, and the nonlinear optical characteristics and piezoelectric constant d31 were determined. The results obtained are shown in Table 3. The film used here had a glass transition temperature of 175° C.

TABLE 3

| DAN (%) | Polarization Temp. (°C.) | $d_{31}$ (pC/N) | SHG Strength |
|---|---|---|---|
| 5 | 150 | 3.2 | 0.3 |
|   | 160 | 4.4 | 0.9 |
|   | 170 | 7.5 | 1.3 |
|   | 175 | 8.8 | 1.8 |
|   | 180 | 9.2 | 2.3 |
|   | 185 | 7.7 | 1.1 |
| 10 | 150 | 3.6 | 4.0 |
|   | 160 | 5.5 | 6.3 |
|   | 170 | 8.4 | 7.8 |
|   | 175 | 9.4 | 9.0 |
|   | 180 | 9.0 | 8.3 |
| 20 | 150 | 3.7 | 7.8 |
|   | 160 | 6.4 | 10.9 |
|   | 170 | 9.8 | 16.0 |
|   | 175 | 10.2 | 17.2 |
|   | 180 | 9.5 | 14.5 |

While the invention has been described in detail and with reference to specific embodiments thereof, it will be apparent to one skilled in the art that various changes and modifications can be made therein without departing from the spirit and scope thereof.

What is claimed is:

1. An optical material obtained by electrically polarizing a high polymer molded article obtained from a composition comprising an alternating copolymer of vinylidene cyanide and at least one comonomer selected from vinyl compounds and other vinylidene compounds having uniformly dispersed therein from 0.1 to 70% by weight of an organic molecular crystal having nonlinear optical effects such that the secondary molecular nonlinear susceptibility of the organic molecular crystals is at least $1 \times 10^{-3}$ esu, with the total amount of the copolymer and the organic molecular crystal being 100% by weight.

2. An optical material as claimed in claim 1, wherein said high polymer molded article is a film, sheet or fiber uniaxially or biaxially stretched from 2 to 6 times based on a linear dimension of the unstretched molded article prior to the electrical polarization.

3. An optical material as claimed in claim 1, wherein said copolymer is an alternating copolymer of vinylidene cyanide and a vinyl compound.

4. An optical material as claimed in claim 1, wherein said composition comprises from 60 to 95% by weight of said copolymer and from 5 to 40% by weight of said organic molecular crystal, with the total amount of the copolymer and the organic molecular crystal being 100% by weight.

5. An optical material as claimed in claim 3, wherein said alternating copolymer comprises vinylidene cyanide and at least one vinyl compound selected from vinyl acetate, vinyl formate, vinyl pivalate, isopropenyl acetate, vinyl butyrate, and vinyl benzoate.

* * * * *